US011544969B2

(12) United States Patent
Wang et al.

(10) Patent No.: US 11,544,969 B2
(45) Date of Patent: Jan. 3, 2023

(54) END-TO-END MULTIMODAL GAIT RECOGNITION METHOD BASED ON DEEP LEARNING

(71) Applicant: Zhejiang Gongshang University, Hangzhou (CN)

(72) Inventors: Huiyan Wang, Hangzhou (CN); Huayang Li, Hangzhou (CN); Jun Luo, Hangzhou (CN); Zeyuan Shao, Hangzhou (CN)

(73) Assignee: Zhejiang Gongshang University, Hangzhou (CN)

( * ) Notice: Subject to any disclaimer, the term of this patent is extended or adjusted under 35 U.S.C. 154(b) by 0 days.

(21) Appl. No.: 17/653,660

(22) Filed: Mar. 7, 2022

(65) Prior Publication Data

US 2022/0343686 A1 Oct. 27, 2022

Related U.S. Application Data

(63) Continuation of application No. PCT/CN2021/104204, filed on Jul. 2, 2021.

(30) Foreign Application Priority Data

Apr. 27, 2021 (CN) .......................... 202110460163.8

(51) Int. Cl.
*G06V 40/20* (2022.01)
*G06V 10/82* (2022.01)
(Continued)

(52) U.S. Cl.
CPC .............. *G06V 40/25* (2022.01); *G06V 10/26* (2022.01); *G06V 10/46* (2022.01); *G06V 10/54* (2022.01);
(Continued)

(58) Field of Classification Search
CPC ........ G06V 40/25; G06V 10/26; G06V 10/46; G06V 10/54; G06V 10/56; G06V 10/776; G06V 10/806; G06V 10/82
(Continued)

(56) References Cited

U.S. PATENT DOCUMENTS 10,929,829 B1 * 2/2021 Hazelwood .......... G06V 30/224
2019/0156113 A1 * 5/2019 Binsaadoon ......... G06V 10/764
(Continued)

FOREIGN PATENT DOCUMENTS

CN 111860291 A 10/2020
CN 112131950 A 12/2020

*Primary Examiner* — Ali Bayat
(74) *Attorney, Agent, or Firm* — Bayramoglu Law Offices LLC

(57) ABSTRACT

An end-to-end multimodal gait recognition method based on deep learning includes: first extracting gait appearance features (color, texture and the like) through RGB video frames, and obtaining a mask by semantic segmentation of the RGB video frames; then extracting gait mask features (contour and the like) through the mask; and finally performing fusion and recognition on the two kinds of features. The method is configured for extracting gait appearance feature and mask feature by improving GaitSet, improving semantic segmentation speed on the premise of ensuring accuracy through simplified FCN, and fusing the gait appearance feature and the mask feature to obtain a more complete information representation.

6 Claims, 3 Drawing Sheets

(51) Int. Cl.
*G06V 10/54* (2022.01)
*G06V 10/776* (2022.01)
*G06V 10/26* (2022.01)
*G06V 10/46* (2022.01)
*G06V 10/80* (2022.01)
*G06V 10/56* (2022.01)

(52) U.S. Cl.
CPC ............ *G06V 10/56* (2022.01); *G06V 10/776* (2022.01); *G06V 10/806* (2022.01); *G06V 10/82* (2022.01)

(58) Field of Classification Search
USPC .......................................................... 382/115
See application file for complete search history.

(56) References Cited

U.S. PATENT DOCUMENTS

| | | | |
|---|---|---|---|
| 2020/0089994 A1* | 3/2020 | Sato ................... | G06K 9/6254 |
| 2020/0205697 A1* | 7/2020 | Zheng ................. | G08B 21/043 |
| 2020/0218793 A1* | 7/2020 | Storm .................. | G06V 40/25 |
| 2020/0342216 A1* | 10/2020 | Binsaadoon ........... | G06V 40/25 |
| 2021/0224524 A1* | 7/2021 | Liu ...................... | G06V 10/82 |
| 2022/0026530 A1* | 1/2022 | Wu ...................... | H04W 4/023 |
| 2022/0148335 A1* | 5/2022 | Liu ...................... | G06V 10/809 |

\* cited by examiner

END-TO-END MULTIMODAL GAIT RECOGNITION METHOD BASED ON DEEP LEARNING

CROSS REFERENCE TO THE RELATED APPLICATIONS

This application is a continuation application of International Application No. PCT/CN2021/104204, filed on Jul. 2, 2021, which is based upon and claims priority to Chinese Patent Application No. 202110460163.8, filed on Apr. 27, 2021, the entire contents of which are incorporated herein by reference.

TECHNICAL FIELD

The present invention belongs to the field of video image processing and gait recognition in computer vision, and more particularly relates to an end-to-end multimodal gait recognition method based on deep learning.

BACKGROUND

Gait recognition is an emerging biometric recognition technology for identity confirmation through pedestrian walking posture. Compared with face recognition, fingerprint recognition and iris recognition, the research of gait recognition starts relatively late. Due to its advantages of non-contact, long distance and being not liable to be affected by camouflage, recognition can be achieved without active cooperation of the object to be recognized. It can be widely used in smart cities, smart transportation and other fields, as well as the scenarios such as looking for suspects and the like.

In recent years, since the deep neural network is applied widely, gait recognition has made great progress. The prior gait recognition methods based on deep learning can be divided into two categories: the template-based method and the sequence-based method, both of which extract pedestrian gait mask features from segmented mask images for recognition. Since the above two methods both extract the pedestrian gait mask features from the manually segmented mask image for recognition, the segmented mask image may lose some useful information for gait recognition, resulting in that the end-to-end gait recognition cannot be achieved.

SUMMARY

In view of the shortcomings of the prior art, the present invention provides an end-to-end multimodal gait recognition method based on deep learning, which can promote the gait recognition accuracy and be widely used in other gait recognition network.

The technical solution provided by the present invention to solve the technical problem includes:

step 1: accessing a pedestrian gait image sequence or video, inputting the pedestrian gait image sequence or video into a gait appearance feature extraction branch based on a GaitSet network to extract an appearance feature $F_{App}$ including color and texture;

step 2: through a simplified fully convolutional network (FCN), namely a semantic segmentation branch, performing a semantic segmentation on an image to obtain a mask containing only pedestrian gait contour information. First six convolutional layers of the FCN share a weight with first six convolutional layers of the gait appearance feature extraction branch;

step 3: extracting a pedestrian gait mask feature $F_{Mask}$ including a contour and the like from the mask by a gait mask feature extraction branch based on the GaitSet network;

step 4: setting appropriate weights for the extracted features to perform a feature fusion, that is $F=p*F_{App}+q*F_{Mask}$. The fusion feature is the final feature extracted by the method proposed by the present invention, which is used for a subsequent calculation of Loss (being trained) and Euclidean distance (forward reasoning);

step 5: when a network is trained, for the fusion feature, calculating a triple loss $L_{BA+}$ and a cross entropy loss $L_{Cross}$ of the semantic segmentation branch to perform a Loss fusion, and setting different weights for weighted summation, that is Loss=$r*L_{BA+}+s*L_{Cross}$; and step 6: when a trained network is configured for forward reasoning, calculating Euclidean distances between fusion features of a pedestrian gait sequence to be retrieved and fusion features of a pedestrian gait sequence in a retrieval database, and calculating a recognition accuracy of rank-1 according the distances.

The advantages of the technical solution provided by the present invention are as follows: After the part of the horizontal pyramid mapping of the GaitSet network is modified, richer features can be extracted, which is more suitable for the multimodal gait recognition method provided by the present invention. By adding a simplified FCN network, the automatic semantic segmentation of red-green-blue (RGB) images can be completed with a less time cost and the end-to-end gait recognition is achieved. Through the fusion of Loss, multiple branches are simultaneously trained. Through the fusion of features, the final representation of extracted features of the network is more rich and complete. The present invention can realize high-precision end-to-end multimodal gait recognition through image sequence or video input without other auxiliary equipment.

BRIEF DESCRIPTION OF THE DRAWINGS

In order to more clearly demonstrate the network structure and the training and forward reasoning process in the embodiment of the present invention, the drawings used in the embodiment are briefly introduced as follows.

DETAILED DESCRIPTION OF THE EMBODIMENTS

In order to describe the present invention in detail, the technical solution of the present invention is described in detail below in combination with the drawings and a specific embodiment.

Figure 1:
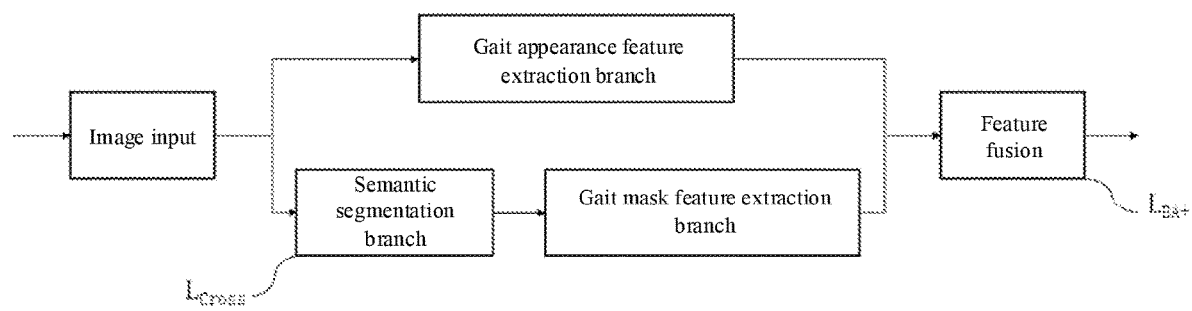
FIG. 1 is a structure diagram of the method of the present invention.

The present invention provides a general end-to-end multimodal gait recognition method based on deep learning. As shown in FIG. 1, the network frame structure thereof mainly includes three branches, namely a gait appearance feature extraction branch, a semantic segmentation branch and a gait mask feature extraction branch.

Figure 2:
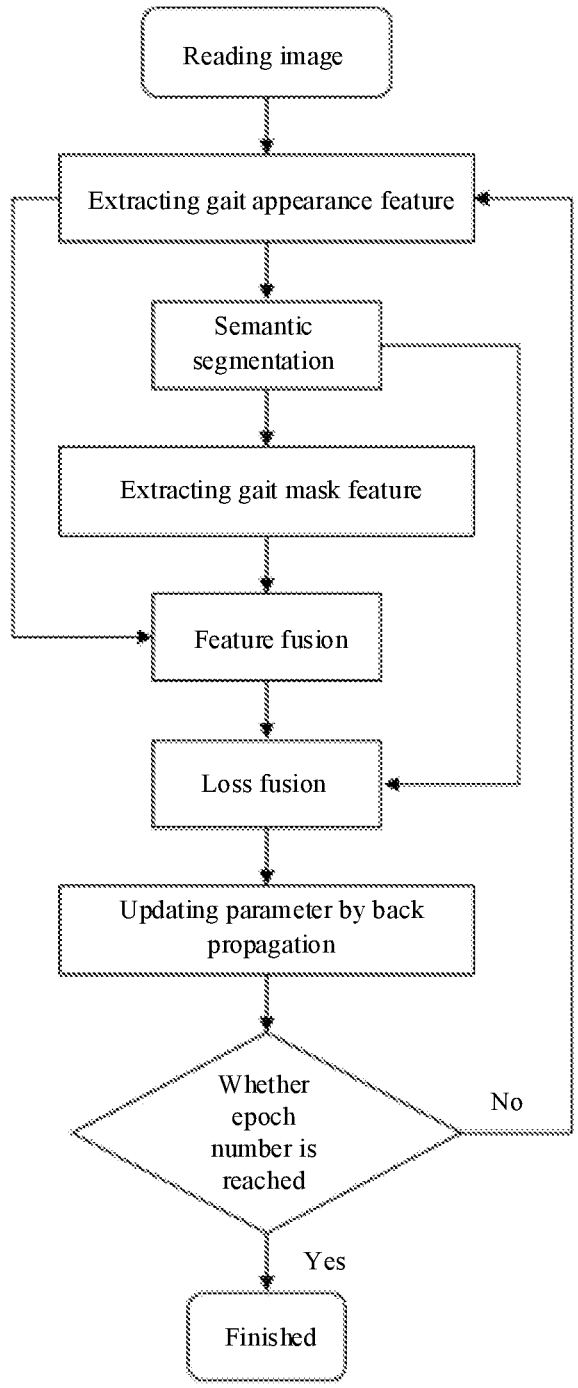
FIG. 2 is a flow chart showing a training of the method of the present invention.

As shown in FIG. 2, the brief steps of a network training process are as follows: 1. video frames are read to extract gait appearance features; 2. semantic segmentation is performed on the video frames to obtain masks; 3. gait mask features are extracted from the masks; 4. the gait appearance features and the gait mask features are fused; 5. the loss of the fusion features and the loss of semantic segmentation are calculated and fused; 6. network parameters are updated by back propagation.

Figure 3:
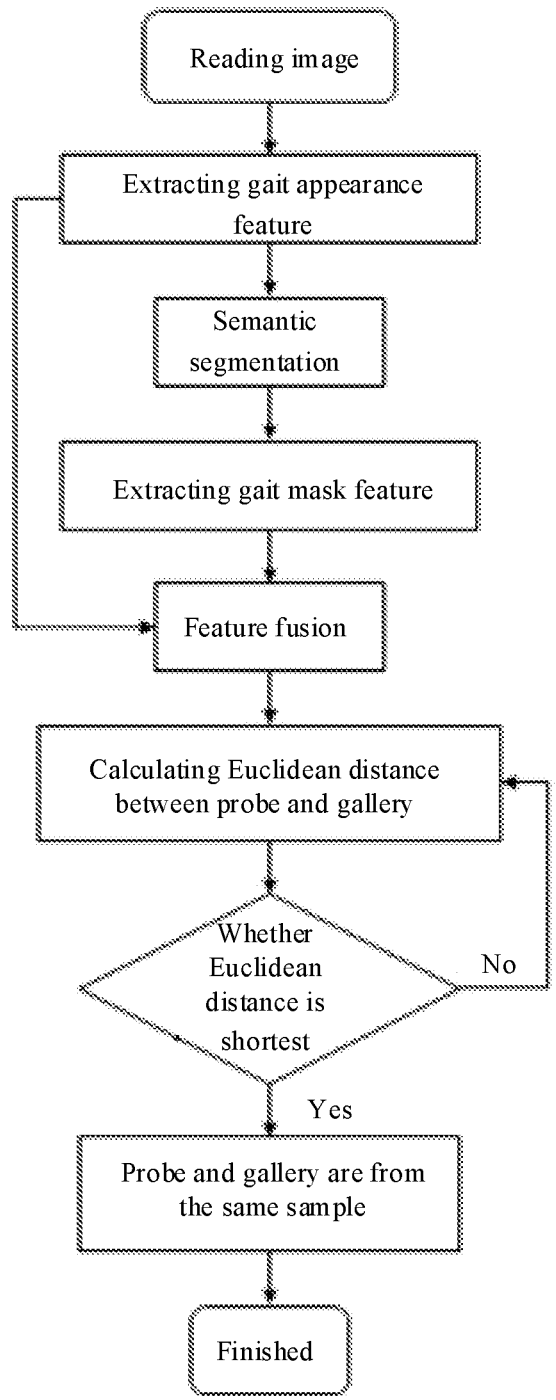
FIG. 3 is a flow chart showing a forward reasoning of the method of the present invention.

As shown in FIG. 3, the brief steps of a network forward reasoning process are as follows: 1. the video frames are read to extract the gait appearance features; 2. the semantic segmentation is performed on the video frames to obtain the masks; 3. the gait mask features are extracted from the masks; 4. the gait appearance features and the gait mask features are fused; 5. the Euclidean distances between the fusion features of probe and the fusion features of gallery are calculated, where the sequences having the closest distances are from the same sample.

Embodiment

A multimodal gait recognition method based on deep learning includes the following steps:

Step 1. A gait sequence or video is accessed to extract the pedestrian gait appearance feature $F_{App}$.

Specifically, the gait sequence or video is input into the gait appearance feature extraction branch to extract the gait appearance feature. The branch is based on the GaitSet gait recognition network. The network is improved as follows: firstly, the number of input channels in an input layer is changed from 1 to 3 to input an RGB image; secondly, the global maximum pooling in spatial pyramid pooling (SPP) is replaced by the sum of global maximum pooling and global average pooling, and the horizontal pyramid mapping (HPM) in GaitSet is replaced; then, attention mechanism squeeze-and-excitation (SE) is configured to promote useful features and suppress features that are useless for gait recognition; finally, an independent full connection layer (FC) is configured to map the features.

Step 2. Through the simplified fully convolutional network (FCN), namely the semantic segmentation branch, the semantic segmentation is performed on the image to obtain a mask that contains only pedestrian gait contour information.

Specifically, the simplified FCN of the present invention includes nine convolutional layers and one upper sampling layer, where the first six convolutional layers share the weight with the first six convolutional layers of the gait appearance feature extraction branch. Compared with the prior FCN, the skip architecture is removed and one convolutional layer is additionally added to ensure the segmentation speed with little loss of accuracy.

Step 3. The pedestrian gait mask feature $F_{Mask}$ is extracted from the mask by the gait mask feature extraction branch based on the GaitSet network. The input layer of the gait mask feature extraction branch is 1, and the rest structure is identical to the gait appearance feature extraction branch.

Step 4. Appropriate weights are set for the extracted features to perform feature fusion, namely $F=p*F_{App}+q*F_{Mask}$. The fusion feature is the final feature extracted by the method proposed by the present invention. According to the experiment, it is concluded that p is 0.8 and q is 0.2.

Step 5. When the network is trained, for the fusion feature, the triple loss $L_{BA+}$ and the cross entropy loss $L_{Cross}$ of the semantic segmentation branch are calculated to perform Loss fusion, and different weights are set for weighted summation, that is, $Loss=r*L_{BA+}+s*L_{Cross}$. According to the experiment, r is 0.7 and s is 0.3.

Step 6. When the trained network is configured for forward reasoning, Euclidean distances between fusion features of a pedestrian gait sequence to be retrieved and fusion features of a pedestrian gait sequence in a retrieval database are calculated, ranking is performed according to the distances, and the recognition accuracy of rank-1 is calculated, where the sequences having the closest distances are from the same sample.

What is claimed is:

1. An end-to-end multimodal gait recognition method based on a deep learning, comprising the following steps:
   step 1: accessing a pedestrian gait image sequence or video and inputting the pedestrian gait image sequence or video into a gait appearance feature extraction branch based on a GaitSet network to extract an appearance feature $F_{App}$ comprising color and texture;
   step 2: through a simplified fully convolutional network (FCN), namely a semantic segmentation branch, performing a semantic segmentation on an image to obtain a mask containing only pedestrian gait contour information;
   step 3: extracting a pedestrian gait mask feature $F_{Mask}$ comprising a contour from the mask by a gait mask feature extraction branch based on the GaitSet network;
   step 4: setting appropriate weights for the extracted features to perform a feature fusion, to obtain a fusion feature for a subsequent calculation;
   step 5: when a network is trained, for the fusion feature, calculating a triple loss $L_{BA+}$, and a cross entropy loss $L_{Cross}$ of the semantic segmentation branch to perform a Loss fusion, wherein the network comprises the gait appearance feature extraction branch, the semantic segmentation branch and the gait mask feature extraction branch; and
   step 6: when a trained network is configured for forward reasoning, calculating Euclidean distances between fusion features of a pedestrian gait sequence to be retrieved and fusion features of a pedestrian gait sequence in a retrieval database, performing ranking according to the Euclidean-distances, and calculating a recognition accuracy of rank-1 according the Euclidean distances;
   wherein
   in step 1, the gait appearance feature extraction branch is obtained by improving on the GaitSet network; the improving on the GaitSet network comprises: changing a number of input channels in an input layer from 1 to 3 to input a red-green-blue (RGB) image, replacing a global maximum pooling in a spatial pyramid pooling with a sum of the global maximum pooling and a global average pooling, and a horizontal pyramid mapping in the GaitSet network is replaced.

2. The end-to-end multimodal gait recognition method based on the deep learning according to claim 1, wherein an attention mechanism is configured to promote useful features, and an independent full connection layer is configured to map the useful features.

3. The end-to-end multimodal gait recognition method based on the deep learning according to claim 1, wherein in step 2, the simplified FCN comprises nine convolutional layers and one upper sampling layer, wherein first six convolutional layers share a weight with first six convolutional layers of the gait appearance feature extraction branch.

4. The end-to-end multimodal gait recognition method based on the deep learning according to claim 1, wherein in step 3, an input layer of the gait mask feature extraction branch is 1, and a rest structure is identical to the gait appearance feature extraction branch.

5. The end-to-end multimodal gait recognition method based on the deep learning according to claim 1, wherein in step 4, a specific process of the feature fusion is $F = p*F_{App} + q*F_{Mask}$, wherein F represents the fusion feature, p represents a weight of the appearance feature $F_{App}$, q represents a weight of the pedestrian gait mask feature $F_{Mask}$.

6. The end-to-end multimodal gait recognition method based on the deep learning according to claim 1, wherein in step 5, a specific process of the Loss fusion is $Loss = r*L_{BA+} + s*L_{Cross}$, wherein Loss represents a fusion loss, r represents a weight of the triple loss $L_{BA+}$, s represents a weight of the cross entropy loss $L_{Cross}$.

* * * * *